W. E. KOEPKE.
SHOCK FORK.
APPLICATION FILED MAY 13, 1919.
1,319,876.
Patented Oct. 28, 1919.
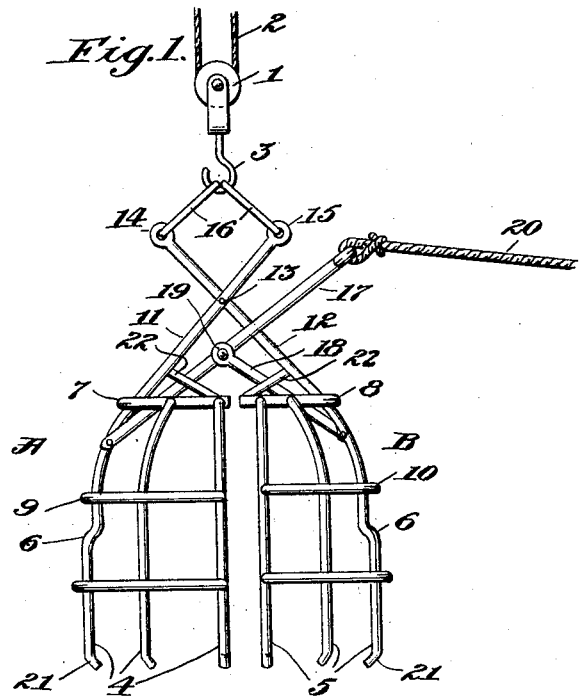
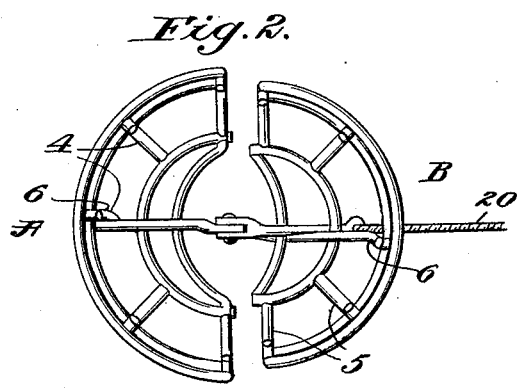
Inventor:
W. E. Koepke,
by Wolfe + Moses
Att'ys.

UNITED STATES PATENT OFFICE.

WILLIAM ERNST KOEPKE, OF SISSETON, SOUTH DAKOTA.

SHOCK-FORK.

1,319,876. Specification of Letters Patent. Patented Oct. 28, 1919.

Original application filed June 1, 1917, Serial No. 172,313. Divided and this application filed May 13, 1919. Serial No. 296,806.

*To all whom it may concern:*

Be it known that I, WILLIAM ERNST KOEPKE, a citizen of the United States, and resident of Sisseton, in the county of Roberts and State of South Dakota, have invented certain new and useful Improvements in Shock-Forks, of which the following is a specification.

This application is a division of my application Ser. No. 172,313, for shock loader, filed June 1, 1917.

The invention relates to a device for loading hay shocks or grain, and in particular to a device which may be used whether the cords tying the shock together are broken or unbroken, and which may be used for shocks of various sizes.

The device in general consists of two movable fork parts, each having a set of tines, a lifting means for drawing the fork parts together to grasp the shock and for raising the fork together with the shock, and a means for spreading the fork parts to release the shock.

In the accompanying drawings, Figure 1 is a side elevation of my fork with an actuating rope and pulley, and Fig. 2 is a bottom plan view thereof.

1 designates a pulley around which passes the rope 2, by pulling which the pulley is raised. The means for pulling the rope is not shown herein, as it forms no part of the invention in this case, but is a part of the invention in the case above referred to.

3 designates a hook on the pulley, upon which the fork is hung.

My fork is formed of two practically semi-circular fork parts A and B, one which, as A, is larger than the other, and the tines 4 of the part A preferably do not engage the shock directly opposite the points of engagement of the tines 5 of the part B. If the fork is so designed that certain of the tines of the two parts would otherwise engage the shock directly opposite each other such tines may be bent to one side as shown at 6.

My fork is accordingly adapted to pick up shocks of different sizes.

The tines of each fork part are attached to more or less semi-circular supports 7, 8, and are reinforced by bands 9, 10. Each fork part A and B has a projecting portion 11, 12 which cross each other at 13 where they are pivoted to each other. Beyond this pivot point and at their ends are eyes 14, 15 which are connected with the hook 3 by suitable ropes or cables 16. Lifting of the hook 3 exerts a force tending to draw the fork parts together. They are opened by means of a toggle consisting of a long lever 17 pivotally attached to the central tine of one fork part and a link 18 pivoted to an intermediate point 19 on the lever 17 and to the central tine of the other fork part. A rope 20 is attached to the lever and by pulling thereon the fork may be opened to release its load.

The lowermost parts of the tines are bent inwardly somewhat as at 21 to grasp the shock more firmly, and they are bent preferably at an obtuse angle to the vertical parts of the tines so that when the fork is opened the binding cords may easily slip thereby.

22 designates a reinforcing support on each fork part for the purpose of firmly and rigidly holding the projecting parts 11 and 12 to the rest of their respective fork parts, and for firmly supporting such fork parts.

What I claim is:

1. A fork comprising two semi-cylinder-like parts of unequal dimensions, one part being capable of fitting within and being partially closed by the other so as to collect and hold the material being handled.

2. A shock fork comprising relatively movable fork parts each of which has a plurality of tines, said fork parts being of different sizes, the shapes and relative sizes being such that the smaller fork part can extend within the larger fork part without the tines of one part passing between adjacent tines of the other part.

3. A shock fork comprising relatively movable fork parts of different sizes having tines, reinforcing members to hold the tines rigid, the tines not being directly opposite any other tine, arms rigidly connected with each fork part and projecting therefrom and being pivoted to each other intermediate their ends, reinforcing members between the arms and the tine reinforcements, a lifting means and a flexible means connecting the ends of the arms to the lifting means.

4. A shock fork comprising relatively movable fork parts of different sizes having substantially upright tines bent inwardly and downwardly at their lower ends, reinforcing members to hold the tines rigid, the tines not being directly opposite any other tine, arms rigidly connected with each fork part and projecting therefrom, and being pivoted to each other intermediate their ends, reinforcing members between the arms and the tine reinforcements, a lifting means and a flexible means connecting the ends of the arms to the lifting means.

WILLIAM ERNST KOEPKE.

Copies of this patent may be obtained for five cents each, by addressing the "Commissioner of Patents, Washington, D. C."